United States Patent [19]
Halter et al.

[11] Patent Number: 5,495,469
[45] Date of Patent: Feb. 27, 1996

[54] COMMUNICATIONS NETWORK, STATE MACHINE THEREFOR

[75] Inventors: Richard A. Halter, Warren; Robert J. Randel, Walled Lake; John Stark, Ann Arbor, all of Mich.

[73] Assignee: Chrysler Corporation, Highland Park, Mich.

[21] Appl. No.: 356,999

[22] Filed: Dec. 16, 1994

[51] Int. Cl.⁶ ..................................................... H04L 5/02
[52] U.S. Cl. .............................. 370/9; 370/85.2; 375/238; 340/825.07
[58] Field of Search .................................... 370/9, 19, 79, 370/85.1, 85.2, 85.3, 85.6, 99; 375/238; 340/825.06, 825.07, 825.5

[56] References Cited

U.S. PATENT DOCUMENTS 5,274,636  12/1993  Halter et al. ........................... 370/85.1
5,287,523  2/1994  Allison et al. ............................. 395/725
5,402,420  3/1995  Kobayashi .................................. 370/85.2

*Primary Examiner*—Melvin Marcelo
*Attorney, Agent, or Firm*—Christopher A. Taravella

[57] ABSTRACT

A link apparatus in a node of a mulitinode, collision—resolution, multiplexing communications system connected between a microcontroller (MCU) and a integrated driver and receiver (IDR) of the node for assuming some of the functions of the MCU in delivering and receiving messages to and from a signal-wire communications bus. The link apparatus provides circuits for automatically prepending a start-of-frame to a message being placed on the bus after determining that the conditions on the bus are suitable for transmitting messages. The link apparatus also contains circuits for determining when a node has won arbitration over another node competing for time on the bus.

11 Claims, 13 Drawing Sheets

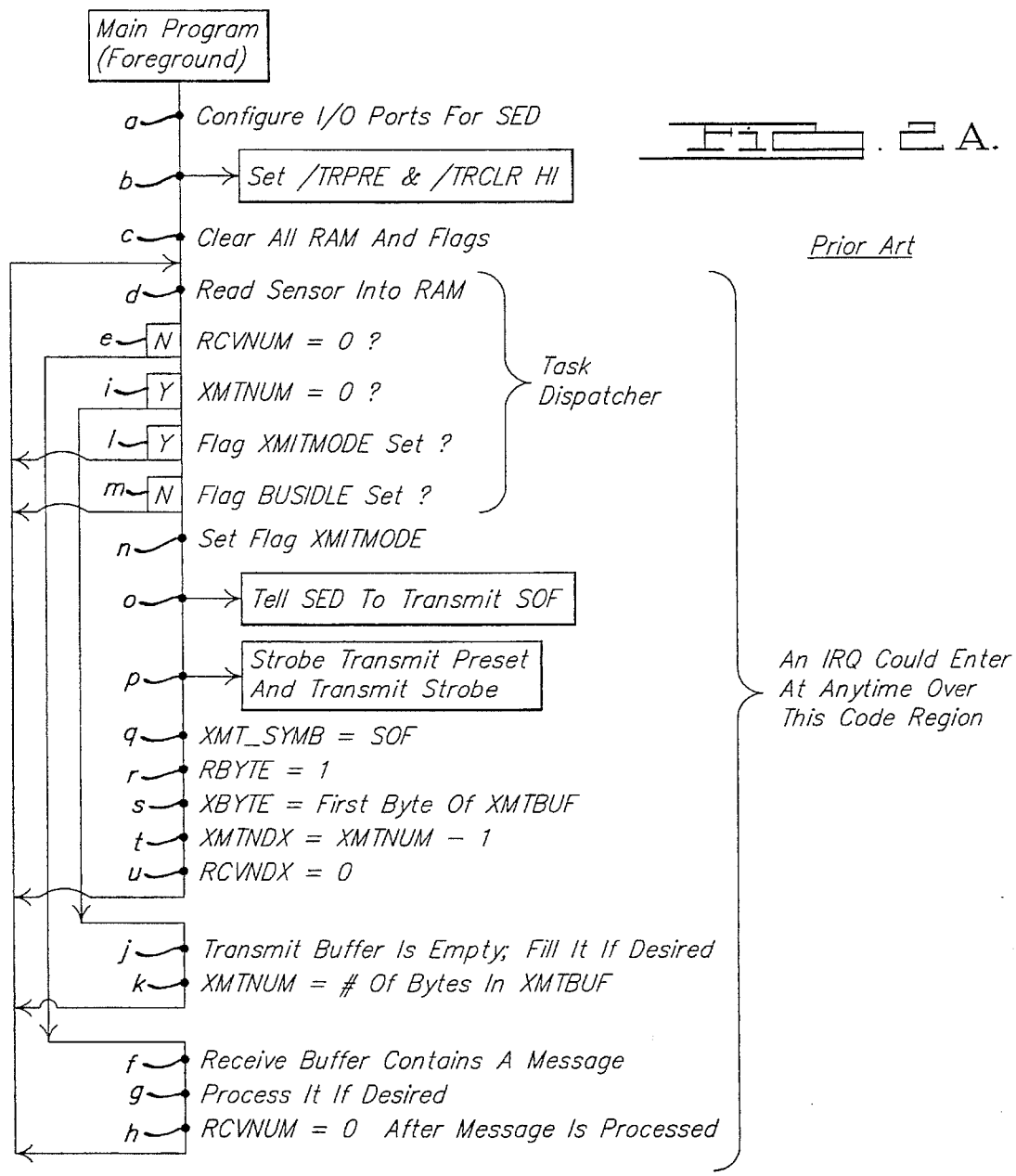
FIG. 2A.  *Prior Art*
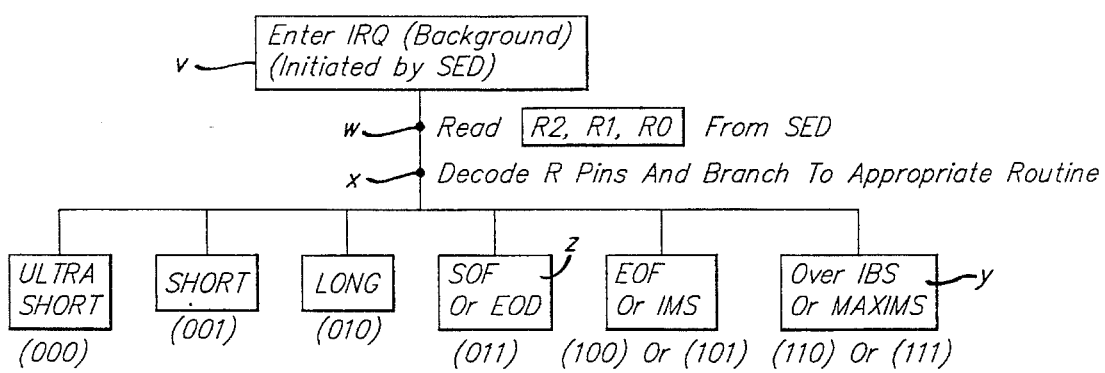
FIG. 2B.  *Prior Art*

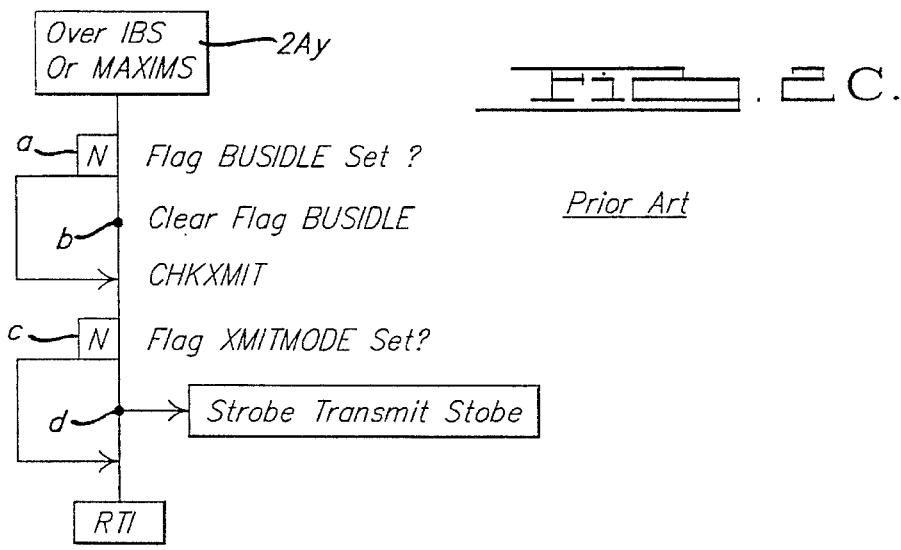
FIG. 2C.
Prior Art
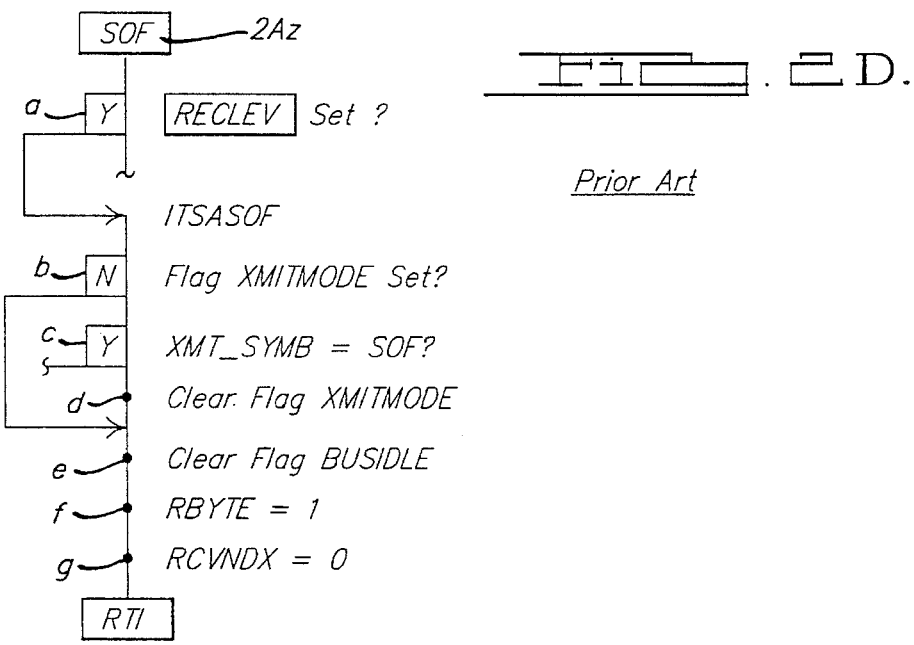
FIG. 2D.
Prior Art
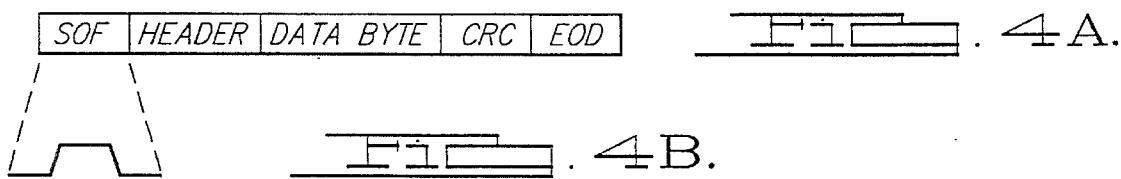
FIG. 4A.
FIG. 4B.
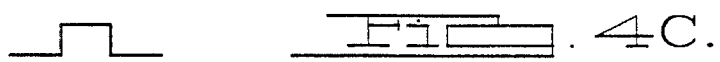
FIG. 4C.

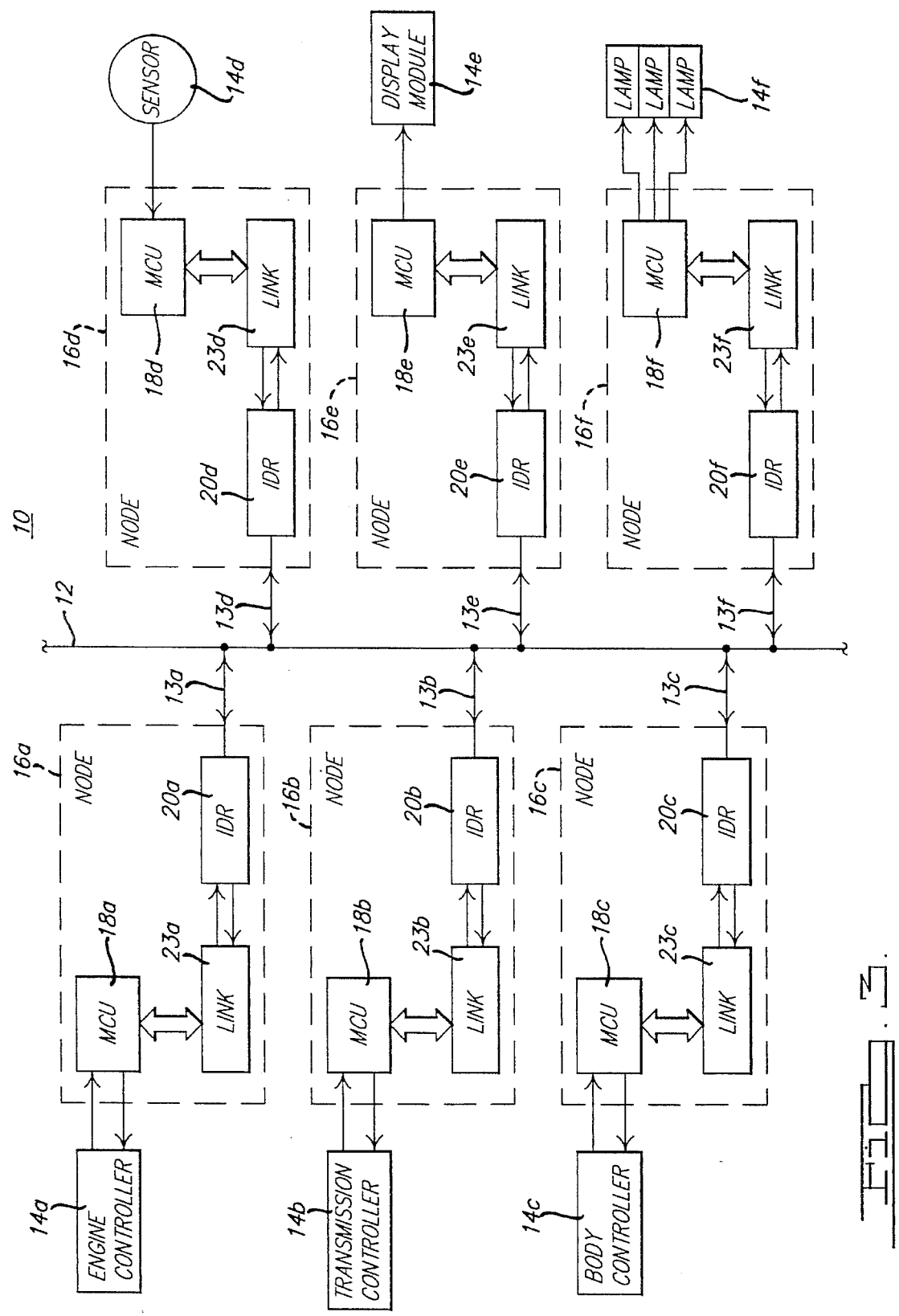

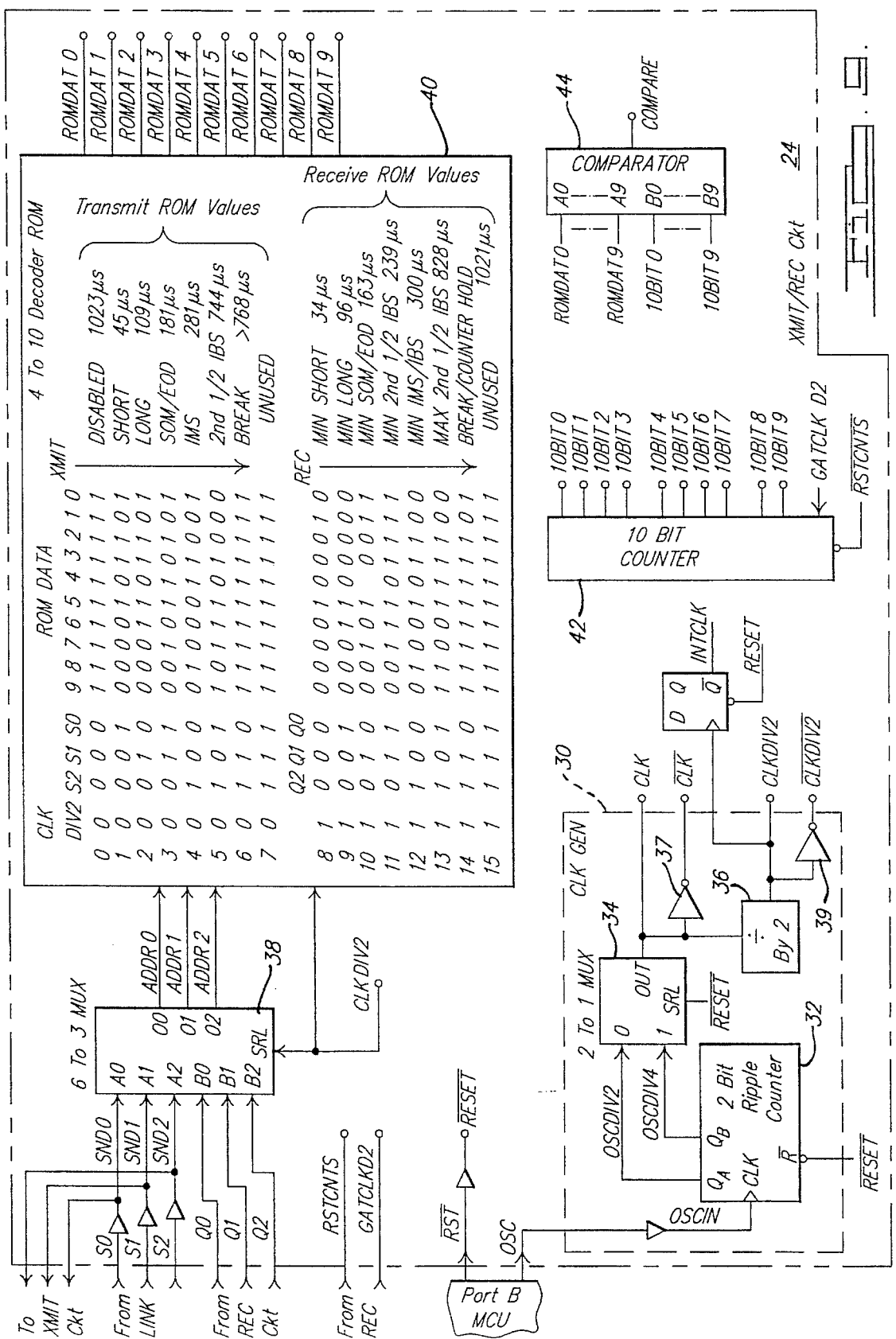

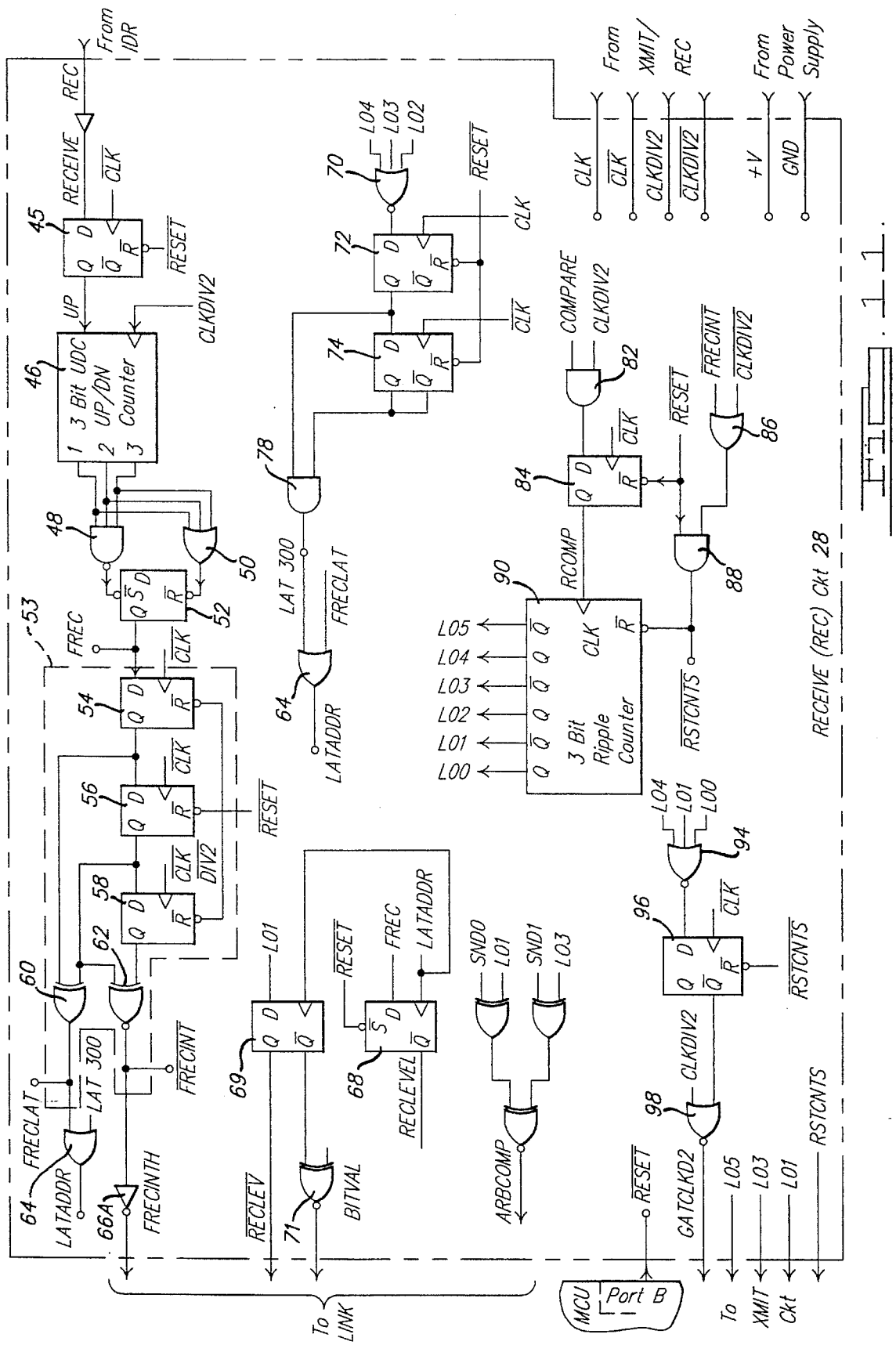

COMMUNICATIONS NETWORK, STATE MACHINE THEREFOR

BACKGROUND OF THE INVENTION

1. Field of the Invention

This invention relates to communication over a multiplex data communications network. In particular, this invention relates to the employment of a state machine to effect transfer of protocol symbols on a bus. The protocol symbols relate to establishment of communication over a data link, preferably a medium speed (Class B) system prescribed by the Society of Automotive Engineers (SAE). SAE established Recommended Practice J1850 (a set of technical requirements and parameters) which the automobile industry accepted as a standard for data communication.

2. Description of Related Art

During an initial try, using an inexpensive microcontroller (MCU), and writing software to generate pulse codes meeting J1850 requirements and then causing transmission of code from the MCU over a single-wire, communications bus (bus) to a second MCU, the transfer occurred too slowly.

To resolve the speed problem, while holding cost down, a combination of an MCU and a cooperating hardware circuit provided a combination for achieving the speed and cost sort for the task. Effort extended towards seeking such a combination resulted in the computer driven symbol-encoder/decoder (SED) described and claimed in U.S. Pa. No. 5,274,636 and assigned to the present assignee. This combination of devices employ an inexpensive MCU for performing some of the tasks necessary to generate J1850 symbols. The SED chip responds to both the MCU and an interface —driver/receiver (IDR). The IDR performs conversions of transmitted digital-pulse codes from the MCU into variable pulse width modulated (VPWM) line codings of J1850 symbols acceptable for transfer over the single-wire bus. The IDR wave shapes the VPWMcodings into the form suitable for transmission over the bus and then drives that signal over the bus where listening nodes can receive it.

The MCU, connected between the input device and the SED, does the following: 1) receives magnitudes of the measurands, 2) formats the magnitudes into address codes for selecting symbols of various pulse widths for transmission over the bus, 3) polls inputs and output ports connected to the IDR via circuits in SED in order to determine the presence of symbols appearing on the bus, 4) initiates transmissions of the symbols over the bus, 5) determines the needs for interbyte separation (IBS) during transmission, and 5) detects and resolves issues of arbitration associated with more than one node transmitting symbols on the bus.

The SED includes a plurality of symbol data in the form of digital coded words stored in a decoder ROM. These words represent the various pulse widths of the various J1850 symbols used to depict the magnitudes of the measurands. Input terminals of the SED accept address codes from the MCU and the SED uses the addresses to select the symbol data words from the decoder ROM and to place the digital-coded words for the selected symbol at the output of the decoder ROM.

The IDR accepts the digitally-coded words from the decoder ROM as serial, digital-data pulses, converts each pulse into a representative analog signal and then transmits the signal, over the single-wire bus to other listening nodes. The IDR in the transmitting node also receives a second set of the serially transmitted analog signals placed on the bus and reconverts the analog signals back to representative digital pulses. This second set of pulses route back to the MCU. The transmitting and receiving of each digital pulse by the IDR occurs in a single cycle of operation.

The SED also includes a digital filter circuit that filters the second set of digital pulses to ensure bit legitimacy and a bit decoding circuit for converting the second set of digital pulses into address codes for addressing a portion of the decoder ROM containing symbol data words representing measurand information contained in the second set of digital pulses.

Another circuit included in the SED interrupts the sequencing of a main program in the MCU upon receipt of the second set of digital pulses and then sends a received address code to the MCU to cause the translation of the second set of digital pulses into the measurand information originally placed on the bus.

The MCU includes software that reacts with byte buffers and flags associated with a random access memory (RAM), firmware that reacts with a read only memory (ROM), a foreground program serving primarily as a task dispatcher and a background program serving primarily to provide selectable task invoked by the received addresses sent from the SED.

Employing this MCU/SED/IDR combination requires 50% of the MCU processing power when transmitting symbols over the bus and 25% of the power when receiving symbols over the bus using a well-known M68HC05 microcontroller of Motorola Corp, Phoenix, Ariz. as the MCU. This arrangement requires at least 12 lines of hardware connections between the SED and MCU and a relative large number of software interfaces within the MCU to meet J1850 requirements.

Realizing the high percentage of processing power and the large number of hardware connections required to implement J1850 using this MCU or an equivalent, we searched for ways to reduce both the hardware and software interfaces while improving the processing performance. That search ended in the present invention which accomplishes reducing the hardware and software interfaces for starting the transmission of a J1850 message, and for performing the reception and arbitration of messages if more than one message appears on the bus nearly simultaneously.

SUMMARY OF THE INVENTION

The present invention discloses a state machine within a hardware link circuit that provides hardware interfaces with an MCU and a SED. This state machine, along with several other devices in the link circuit, makes it possible to use the well-known M68HC05 MCU yet reduces the processing power to about 5% for both transmitting and receiving J1850 symbols and the number of hardware interfaces by about 48%. This state machine circuit includes statein and stateout circuits that interface with the SED and the MCU respectively. An encoder circuit generates address codes that route to a symbol encoder decoder circuit for generating J1850 symbols for forming messages on the single-wire bus. The encoder circuit operates in response to commands from the state machine. A vector reset circuit cooperates with the state machine to determine arbitration between protocol symbols competing for time on the bus when two or more nodes start transmissions nearly simultaneously.

A reduction in the processing power of the MCU occurs if the link accomplishes in hardware some of the functions normally achieved in software and firmware. One such function is the prepending of the protocol symbol (SOF) to the first data byte of the message frame that occurs in response to handshaking of the MCU.

BRIEF DESCRIPTION OF THE DRAWING

The invention and its modes of operation will be more fully understood from the following detailed description when taken with the appended drawing figures in which:

FIG. 2A depicts in flowchart form a prior art foreground program used to control operations of SED in the MCU/SED SYS of FIG. 1;

FIG. 2B–2D depict in flowchart form a prior art background program used in conjunction with the foreground program of FIG. 2A to control operations of SED in the MCU/SED SYS of FIG. 1;

FIG. 3 depicts the MCU/LINK SYS network of the present invention;

FIG. 4A, 4B and 4C depict the start of frame protocol symbol of a message frame;

FIGS. 8A and 8B illustrate the logic circuits in link 23 for carrying out the formation, generation and checking for arbitration of the SOF symbol;

FIG. 9 illustrates in partial pictorial, partial block and logic diagram form the transmit/receiver circuit of the symbol encoder decoder;

FIG. 10 illustrates in partial block and logic diagram form the receive circuit of the symbol encoder decoder.

DETAILED DESCRIPTION OF A PREFERRED EMBODIMENT

The Prior Art System (MCU/SE SYS)

Figure 1:
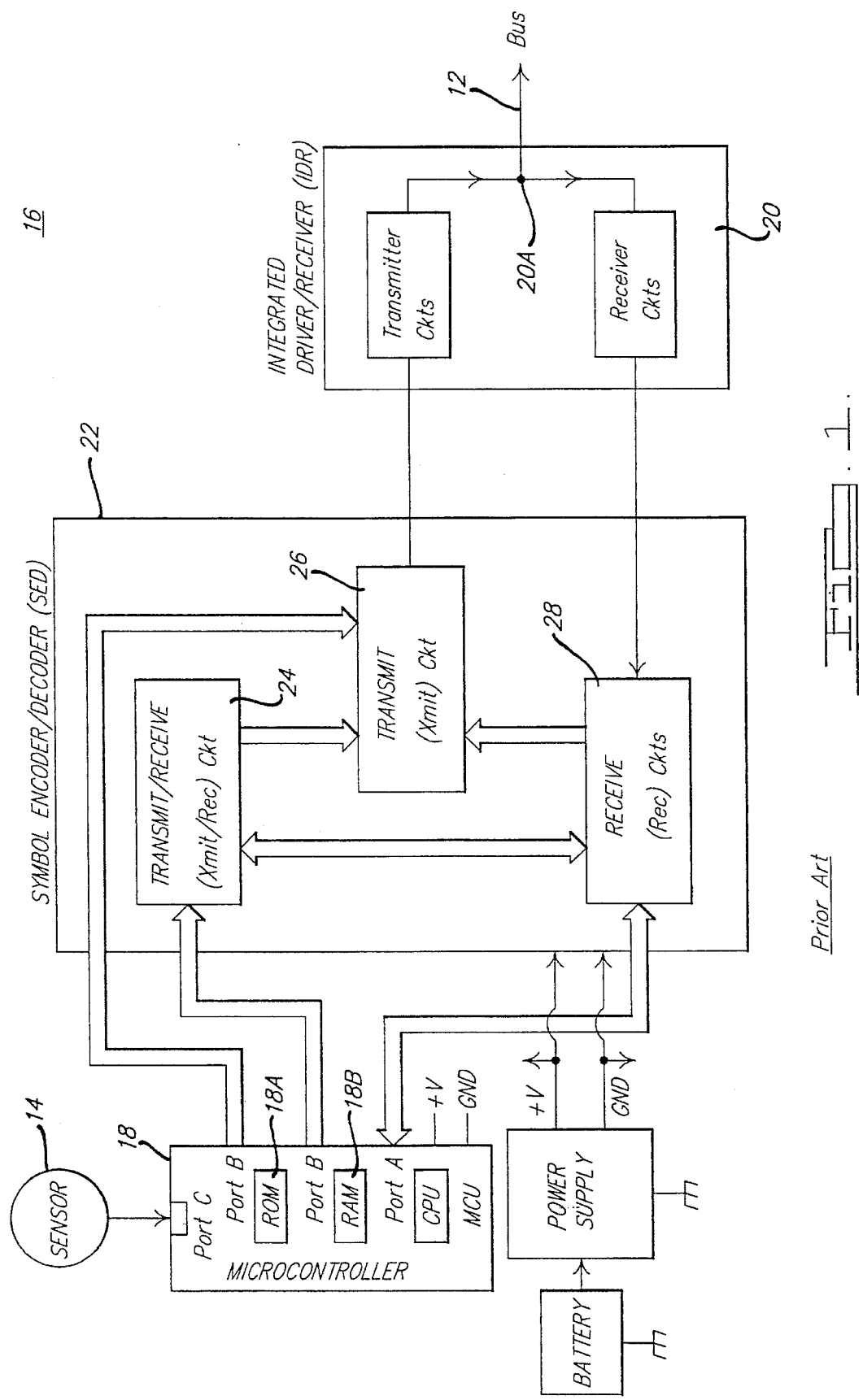
FIG. 1 illustrates in block diagram form components forming a prior art node in a prior MCU/SED SYS network.

The present invention MCU/LINK SYS provides an improvement over the prior art MCU/SED SYS. FIG. 1 shows connections of sensor 14, MCU 18, SED 22, and IDR 20 in node 16 of the prior art MCU/SED SYS in block diagram form.

MCU/SED SYS-MCU MAIN PROGRAM OPERATION

The software used by MCU 18 consists of two parts, foreground (non-interrupt routine) or the main program (FIG. 2A), and background (interrupt routines) (FIG. 2B). External interrupt signals from SED chip 22 trigger into operation the interrupt routine. In this system, MCU 18 performs the normal housekeeping instruction of configuring the bi-directional input/output (I/O) ports for establishing communications with SED chip 22. After configuring the I/O port, the main program instructs MCU 18 to store at port B a HIGH transmit preset (/TRPRE) and transmit clear (/TRCLR) signals for use by XMIT CKT 26. These signals place XMIT CKT of SED chip 22 in condition for accepting messages for transmission over bus 12. Then the main program instructs MCU 18 to clear all RAM locations of variables and flags since these locations could have random data at start up. (See steps a–c of FIG. 2A).

MCU/SED SYS-TASK DISPATCHER

The task dispatcher, a control routine in the main program, selects from the task queue (list) the next processing task and gives that task control of the central processing unit (CPU). As the task dispatcher, MCU 18 fetches the content of either a string of variable bytes, flags, or I/O ports to determine whether to go into a transmitting or receiving mode.

MCU/SED SYS-CHECKING THE STATUS OF THE SENSOR

MCU 18 reads input port C to see if sensor 14 has outputted a signal. A signal at this port may put MCU 18 in a transmitting mode. (See step d).

MCU/SED SYS-CHECKING THE STATUS OF THE BUS

After checking the status of the sensor, MCU 18 checks the status of a receive number (RCVNUM) byte. If no messages appear on bus 12, then the RCVNUM byte will show 0. An interrupt request (IRQ) from SED chip 22 occurs if a message appears on bus 12 and the decoding of the message takes place in the background routines. A receive buffer (RCVBUF), which holds up to 12 bytes will contain a message. MCU 18 will decode the message and process it if desired. If an inappropriate or undesirable message appears on the bus, MCU 18 may skip processing it and wait for the next message. MCU 18 makes this determination by using error detection schemes such as Checksum and Cyclic Redundancy Checks (CRC) or by ID and address checks for unwanted data. Either way, the contents of the RCVNUM byte are returned to "0". Afterward, the task dispatcher routine recirculates and reenters the task dispatcher loop. (See steps e–h).

MCU/SED SYS-TRANSMITTING A MESSAGE

To transmit a message, MCU 18 must receive an input signal from a sensor or keyboard serving in the place of a sensor. Assume when MCU 18 reads the sensor signal or keyboard entry at port C, a signal appears. Then MCU 18 will enter a transmit mode. (See step d).

MCU/SED SYS-OBTAINING A MESSAGE FOR A SENSOR

If no IRQ's interrupt the sequencing of the main program, then the RCVNUM byte will contain a "0" and the task dispatcher will look to determine if the transmit number (XMTNUM) byte contains a "0". Since MCU 18 is not transmitting as of yet, the program will execute a branch instruction which will allow the empty XMTBUF to fill up with the operational code (op code) equal to the value of the decoded sensor signal, illustratively $(1100\ 0000)_2$. (See steps d–e, i–k).

MCU/SED SYS-MONITORING THE BUS BY CHECKING FOR A BUS IDLE FLAG

MCU 18 now poised to communicate with SED chip 22 after fetching a message, the main program again recirculates to again read port C for a sensor output signal. More than likely, the same message will still exist, the RCVNUM byte will contain a 0, but the XMTNUM byte will contain a count of 1 byte. If bus 12 remains idle for 300 µs, SED 22 will send an IRQ to MCU 18. A BUSIDLE flag will set indicating bus 12 is idle and a message may be transmitted. (See steps d, e, i, 1 and m).

MCU/SED SYS-STARTING TRANSMISSION OF A MESSAGE BY SENDING A SOF SYMBOL (A PROTOCOL SYMBOL)

The program will sequence to the next instruction outside of the task dispatcher and cause MCU 18 to execute instructions that will place SED 22 in a position to transmit a start of frame (SOF) routine by providing send (S)-addresses at port B, a three bit code indicative of SOF code 011. The SOF represents a protocol symbol needed in order to establish frames of data that form the messages placed on bus 12. Also, MCU 18 will also strobe /TRPRE and TRSTRB pins also at port B.

Then MCU 18 will put the SOF symbol in the XMT-SYMB byte, the current receive byte (RBYTE) will equal $(0000\ 000)_2$, the current XBYTE will equal the content of the XMTBUF $(1100\ 0000)_2$ the XMTNDX will equal XMT-NUM−1 or 0, and the RCVNDX byte will equal 0 since bus 12 does not contain a symbol. The main program continues to loop through the task dispatcher monitoring the sensor and the bus. (See steps n–u).

MCU/SED SYS-SED CHIP RESPONSE TO THE LEADING EDGE OF THE SOF SYMBOL

SED Chip 22 wants to measure the time the previous symbol remained on bus 12, the time previous to the leading edge transition of the SOF symbol.

Almost immediately after receiving the leading edge of the SOF symbol from MCU 18, SED chip 22 (REC CKT) sends a LOW IRQ (/IRQ) pulse to a pin in port A, a LOW receive level (RCV-LVL) signal to port A and an R-address, 3-bit code (111) in parallel form to other pins in port A. With the /IRQ, SED chip 22 informs MCU 18 that a leading edge appeared with the R-address. Previous to this leading edge, a maximum inter-symbol separation period occurred in which bus 12 remained LOW for at least 300 μs and with the LOW RCV-LVL signal, a high signal now appears on bus 12.

MCU/SED SYS-MCU 18 RESPONSE TO THE MAXIMS INTERRUPT SIGNAL FROM SED CHIP

An IRQ enters the background routine and MCU 18 reads the incoming R-code, decodes the R-code and then branches to the appropriate (at this time, a maximum inter-symbol separation (MAXIMS) routine.

In the MAXIMS routine, MCU 18 examines the BUSIDLE flag for a set condition, knowing that symbol transmissions start with the bus in an idle state. A set BUSIDLE flag exists, therefore MCU 18 clears the BUSIDLE flag to indicate that bus 12 is no longer idle. The program branches to the CHKXMIT routine.

In the CHKXMIT routine, MCU 18 examines the status of the XMITMODE flag. Since the XMIT-MODE flag was previously set, MCU 18 puts a TRSTRB pulse at port B enabling SED chip 22 to transmit the remaining portion of the SOF symbol; then the CHKXMIT routine terminates with a return from interrupt instruction (RTI). (See steps v–y and 2AY, a–d).

MCU/SED SYS-SED CHIP RESPONSE TO THE FALLING EDGE OF THE SOF SYMBOL

When the falling edge of the SOF symbol occurs, bus 12 goes LOW, and SED chip 22 generates another /IRQ pulse, a HIGH RCV-LVL signal and a R-address code of (011) to indicate the type symbol i.e., the SOF symbol.

MCU/SED SYS-MCU 18 RESPONSE TO THE SOF SYMBOL

MCU 18 fetches an /IRQ pulse from its IRQ port; the R2,R1 & R0 codes from port A; decodes the symbol address from SED chip 22 (obtaining an address of 011) and then branches to the appropriate service routine (SOF or end-of-data (EOD)). (See steps v–x, and z).

MCU/SED SYS-SOF ROUTINE

MCU 18 receives instructions to read the RVC-LVL signal at port B to determine if the incoming symbol address represents a SOF or an EOD. A HIGH or set level of the RVC-LVL signal indicates a SOF symbol, a LOW level indicates an EOD symbol. Since SED chip 22 sent a HIGH RCV-LVL signal, the program instructs MCU 18 to branch to the ITSASOF routine. (See FIG. 2D routine 2AZ step a).

MCU/SED SYS-ITSASOF ROUTINE

In the ITSASOF routine, MCU 18 determines if a XMIT-MODE flag was set in the main program. This test determines whether the SOF symbol originated from the source node or another node. If the SOF symbol originated from another node, then MCU 18 clears the XMITMODE flag, sets the RBYTE to 1 and the RCVNDX to 0 in preparation to receive the symbol from the other node.

If a set XMITMODE flag exists, MCU 18 determines if the XMT-SYMB byte contains the code for a SOF symbol. If it does not, then MCU 18 clears the XMIT-MODE flag and prepares to receive the symbol from the other node. If the XMIT-SYMB byte contains the code for a SOF, then the program branches to the XMITBIT routine. (See FIG. 2D routine 2AZ steps a–g).

MCU/SED SYS PERFORMANCE

As one can see, the prior MCU/SED SYS does require much computer power to perform J1850 symbol communication. The steps outlined above permits placing a protocol system (SOF) on the bus. In addition to the computing steps required, at least seven (7) hardware interfaces between MCU 18 and SED 22 were needed to perform the transfer of this type system. Such a system works best in a stand alone situation where sharing computer usage with a plurality of devices such as in an automobile environment would not be most efficient. In an automobile environment where computer usage is shared by a plurality of devices, some means must be employed that would reduce the computing requirements of the MCU. The present system presents a communications network that is more "shareware-friendly" when it comes to processing data.

The Present System

FIG. 3 depicts a block diagram of a communications network 10 with several nodes 16a–16f employing links 23a–23f of this invention coupled between a single-wire bus 12 and a plurality of sensors or application devices 14a–14f. Each of the links 23a–23f couples between one of the MCUs 18a–18f and one of the IDRs 20a–20f within nodes 16a—16f, respectively. Each of the nodes 16a–16f connects to bus 12 via a stub 13a–13f, respectively.

Bus 12 routes near each node disposed throughout the vehicle supporting bi-directional transfer of a single data bit stream for various sensed or manually introduced applications.

Nodes 16a–16f permit exchange of bit stream information under control of almost any established protocol.

PREPENDING A PROTOCOL SYMBOL (SOF) USING THE PRESENT MCU/LINK SYS.

J1850 messages require a protocol symbol (SOF) to precede a header and one or two protocol symbols (EOD and EOF) to follow the CRC bytes in a message frame as depicted in FIG. 4A. The present system accomplishes the prepending the protocol symbol with less computing effort than it took in the MCU/SED SYS.

Figure 4D:
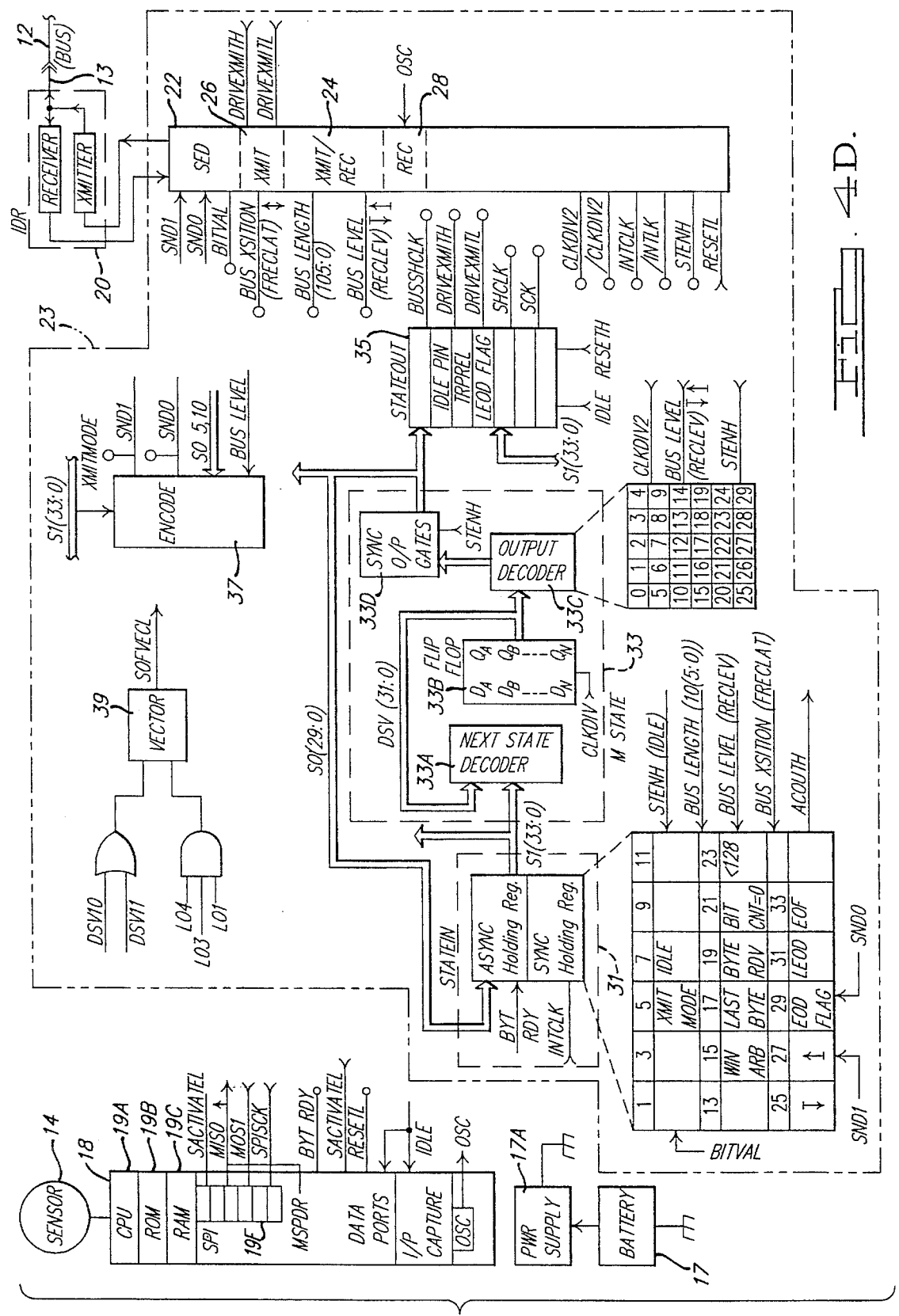
FIG. 4D illustrates in block diagram form the components forming a node of the network of FIG. 3.

As mentioned supra, and shown in FIG. 4D, in the present network 10, a node 16 includes the MCU/LINK SYS comprised of a MCU 18, a link 23 and an IDR 20.

LINK-SED/STATEIN CIRCUIT INTERFACE

Link 23 of FIG. 4D contains a SED 22 which connects to IDR 20 in the same manner as in the prior art system. SED 22 also interfaces with an encoder circuit 37 used to accept control signals from a STATEIN circuit 31 for initiating the generation of symbols on bus 12 via SED 22. Link 23 interfaces with MCU 18 by way of STATEIN circuit 31 comprised of mainly asynchronous and synchronous holding registers. The STATEIN circuit 31 also interfaces with SED 22 through control and data lines which provide status of the bus and control information to link 23.

LINK-STATEIN CIRCUIT/MSTATE MACHINE INTERFACE

To relieve MCU 18 of some of the responsibility for prepending the SOF to a message, link 23 employs a main state machine (MSTATE) 33. Using MSTATE 33, a Moore Type finite state machine, yields the advantage of determining the actions of the machine at any given time from only two variables, i.e., the previous input and the previous state. Clock pulses used to synchronize operations help to avoid problems found in asynchronous circuits such as hazards and critical races. In FIG. 4D, delays in feedback lines, in general, differ from each other. Using clock pulses to synchronize the delay elements, the state machine can model synchronous circuits.

MSTATE 33 breaks down into four blocks: the next-state (NS) decoder 33a, the memory elements 33b, the output decoder 33c and the synchronous output gates 33d.

The NS decoder 33a comprises combinational logic that evaluates both the state-machine inputs (STATEIN (SI)) signals (SI 33:0) from STATEIN circuit 31 and the (D flip-flop) values DSV 31:0 in bit form from the output decoder 33c.

The memory elements (D-flip flops) 33b contain the current state of the state machine in bit form.

The output decoder 33c comprises combinational logic that monitors the present state and asserts output signals accordingly to the STATEIN circuit 31 and to a STATEOUT circuit 35.

TIMING WITHIN THE STATE MACHINE

As noted in FIG. 4D, SED provides clock signals for the node. An OSC signal from MCU 18 provides a source of continuous and accurate clock signals used for clocking system operations.

THE CLK SIGNAL

Figure 6:
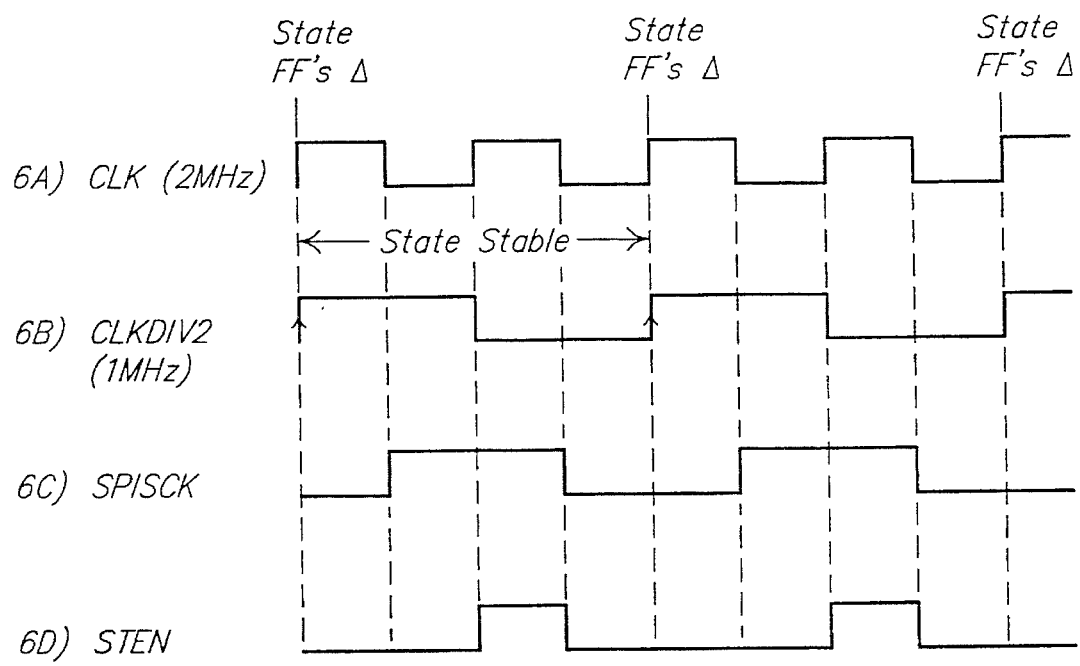
FIG. 6A–6B illustrates the timing systems employed by link 23.

After dividing OSC into OSCDIV2 and OSCDIV4, a multiplexer (MUX) circuit (not shown) extracts from the two pulse trains a first clock signal (CLK) of FIG. 6A of a chosen frequency, e.g., 2 MHz and the inverse clock signal (CLKL).

THE CLKDIV2 SIGNAL

Within SED 22, a sequential logic divide by two (2) circuit converts, illustratively, the 2 MHz CLK signal to a 1 MHZ CLKDIV2 signal of FIG. 6B that routes to various sequential logic circuits of link 23. CLKDIV2 signals control the transfer of input signals into link 23 and the changing of the states. Note in FIG. 4D, the rising edge of the CLKDIV2 signal clocks memory 33b.

THE INTCLK SIGNAL

A combinational logic circuit converts CLKDIV2 to a 1 MHz INTCLK signal of FIG. 6C offset from CLKDIV2 by a ¼ cycle. The INTCLK signal clocks the setting of flags and other output signals from link 23 including SO-0 through SO-33. INTCLK combines with other control signals to create additional control signals that occur at the same time as INTCLK.

THE STENH SIGNAL

Another delay circuit converts the INTCLK signal into a ¼ cycle pulse occurring in the last ¼ of the INTCLK cycle. The STENH signal, FIG. 6D, provides the clock signal for changing states after conditions for a change to the next state occurs.

LINK-MSTATE/STATEOUT INTERFACE

The STATEOUT circuit 35 includes latches and registers for providing output signals to SED 22 and MCU 18. This arrangement using link 23 reduces some of the computer power of MCU 18 required to provide output signals to SED 22 freeing it up for other computing functions within the vehicle. To illustrate this power of link 23, the following description will point out how the MCU/LINK SYS accomplishes prepending a SOF symbol to a message frame.

LINK-ENCODER AND VECTOR CIRCUITS

Figure 7:
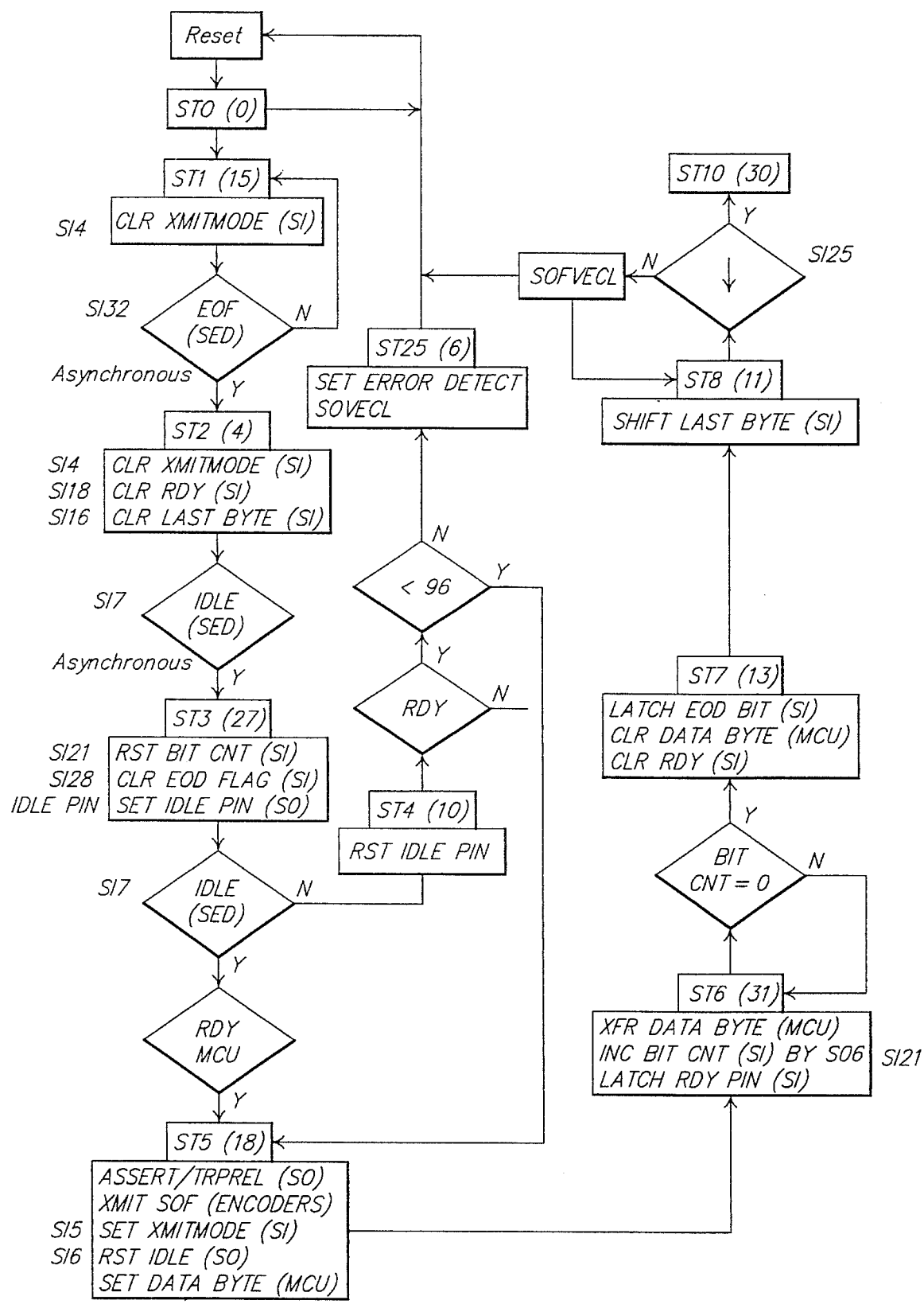
FIG. 7 depicts in state diagram form the various state operations required to generate and test arbitration of the SOF protocol symbol.
Figure 5A:
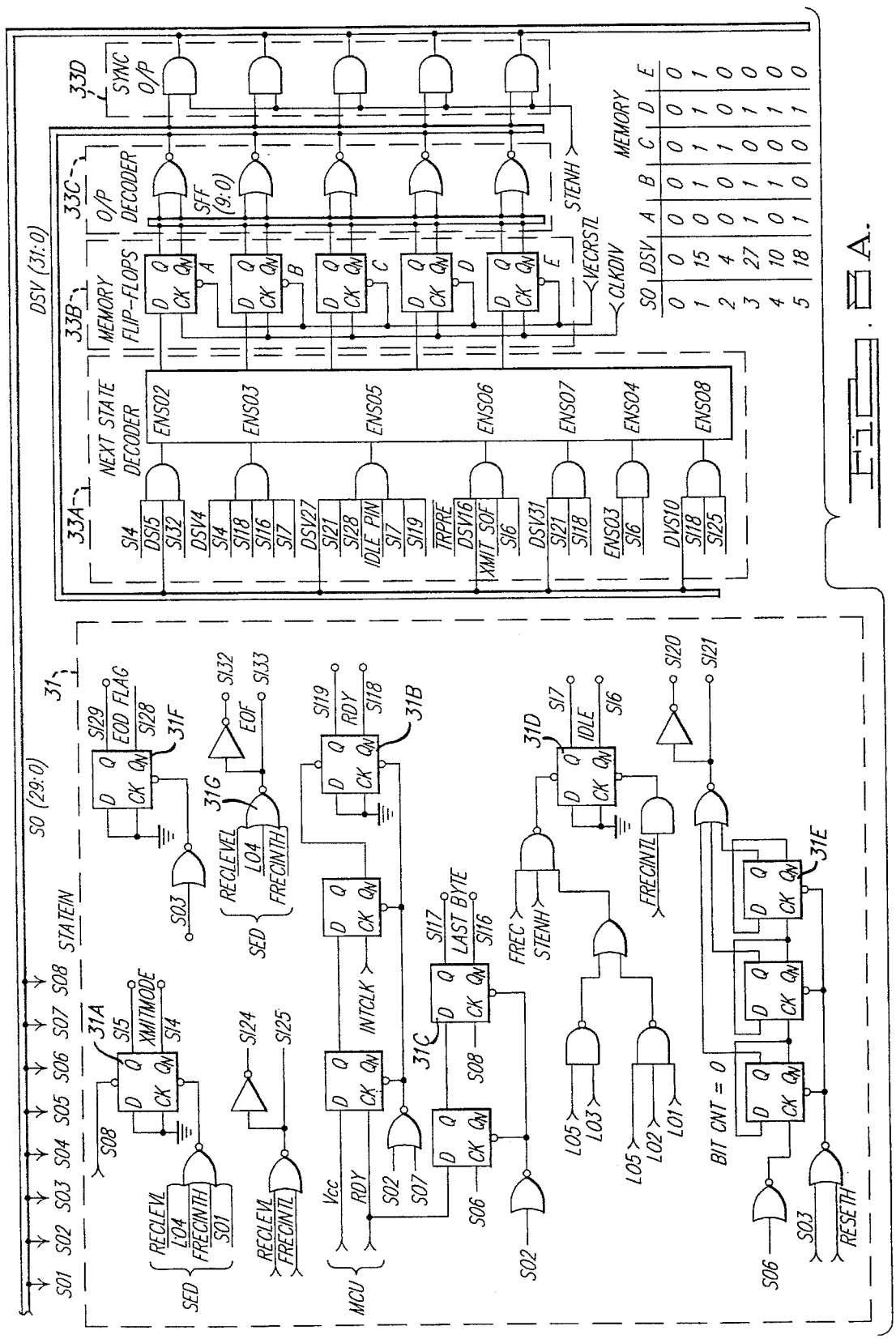

Referring to FIGS. 4 and 7, when MSTATE 33 reaches ST5, a transmit preset (TRPREL) signal generates which initiates the transmission of a HI output signal on the SED transmit pin. In addition, entering ST 5 causes encoder 37 to issue SND0 and SND1 address codes to SED causing SED to transmit bits of the appropriate duration on bus 12 for forming the SOF symbol.

The vector circuit 39 provides a SOF vector error signal if link 23 receives a SOF symbol in a state other that ST4 or ST8.

MCU/LINK SYS MCU OPERATIONS TO ACCOMPLISH PREPENDING SOF

Figure 5A:
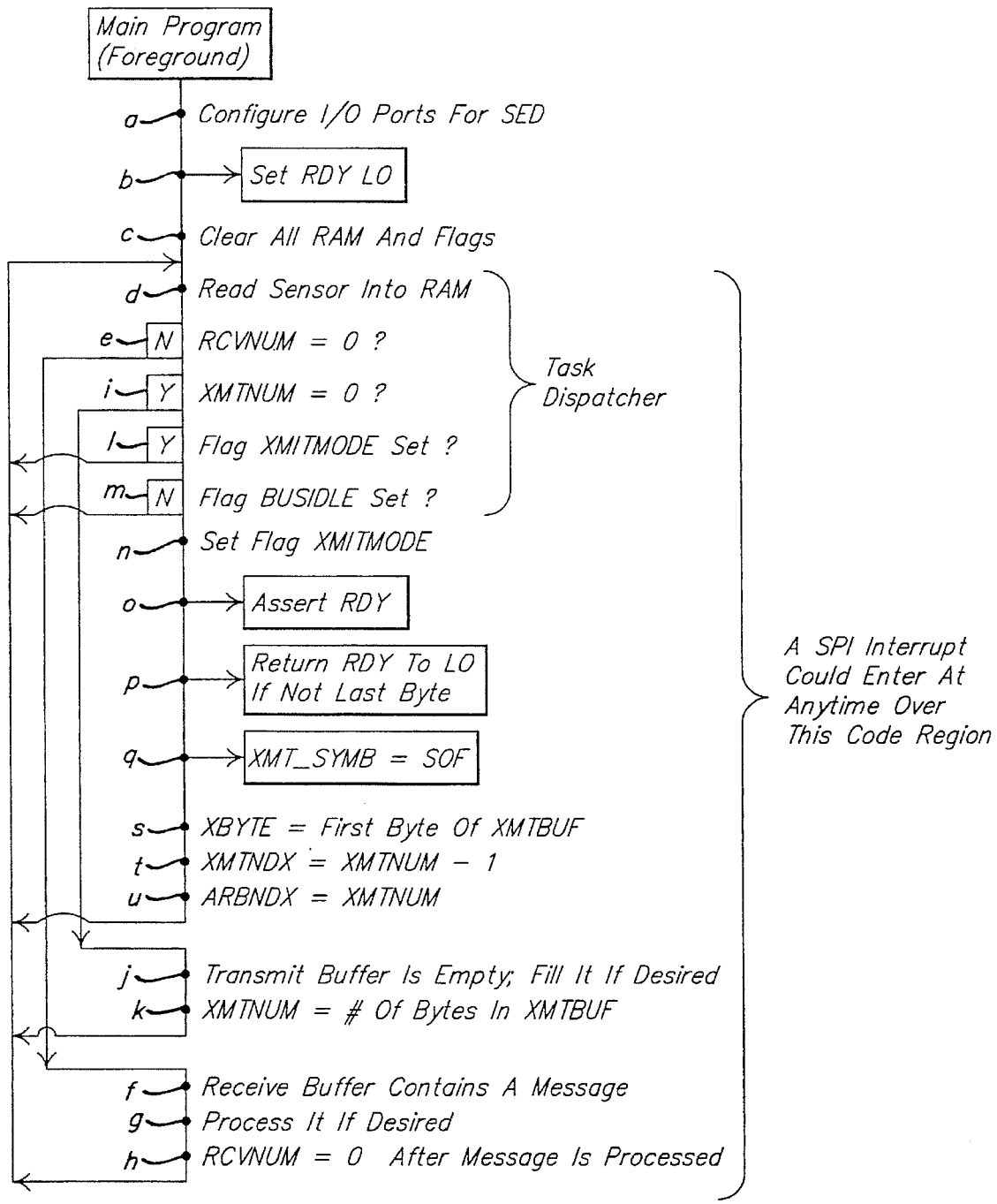
FIGS. 5A–5B depict in flowchart form a foreground program and a background program respectively used to control the operation of link 23 in the present MCU/LINK SYS.
Figure 5B:
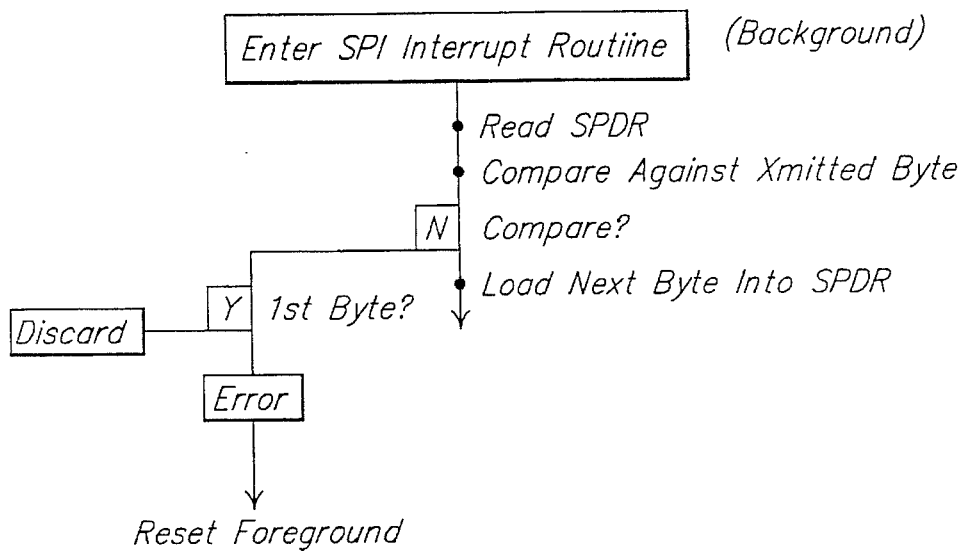

Assume MCU 18 detects the beginning of a message from sensor 14 of FIG. 4D. The software in MCU 18 operates in the same manner as in the prior art MCU/SED system from steps a–n as depicted in FIG. 5A. However, at step o, MCU 18 asserts a RDY signal (RDY is short for BYTE READY) and then returns the RDY signal to LO if a transmit buffer within MCU 18 does not contains the last byte of a message. It may contain the initial or a succeeding byte. Since a HI RDY signal initiates a message frame, then MCU 18 returns the RDY signal to LO and continues to perform other tasks unrelated to prepending a SOF symbol.

LINK MONITORING THE BUS AND ACCEPTING THE RDY PULSE FROM MCU

With reference to FIG. 7, the state diagram of FIG. 7 depicts a sequence of states used to step through the various operations required to transmit and receive data to and from bus 12 using link 23 and MCU 18. The numbers (ST-xx) within or near the rectangles indicate the internal states of link 23 and the comments within the rectangles name the output actions occurring as a result of entering that state. The name within the diverting direction (Y or N) diamonds indicate state input signals and the path the input signal takes after receipt or non-receipt of that particular signal. Lines running between input diamonds or internal state rectangles provide direct paths to the next state or the paths designated by the direction diamonds. Included in parentheses, in the internal state rectangles, are the digital state values (DSV) representing the binary value of the output of the five gates in memory 33b.

Figure 8B:
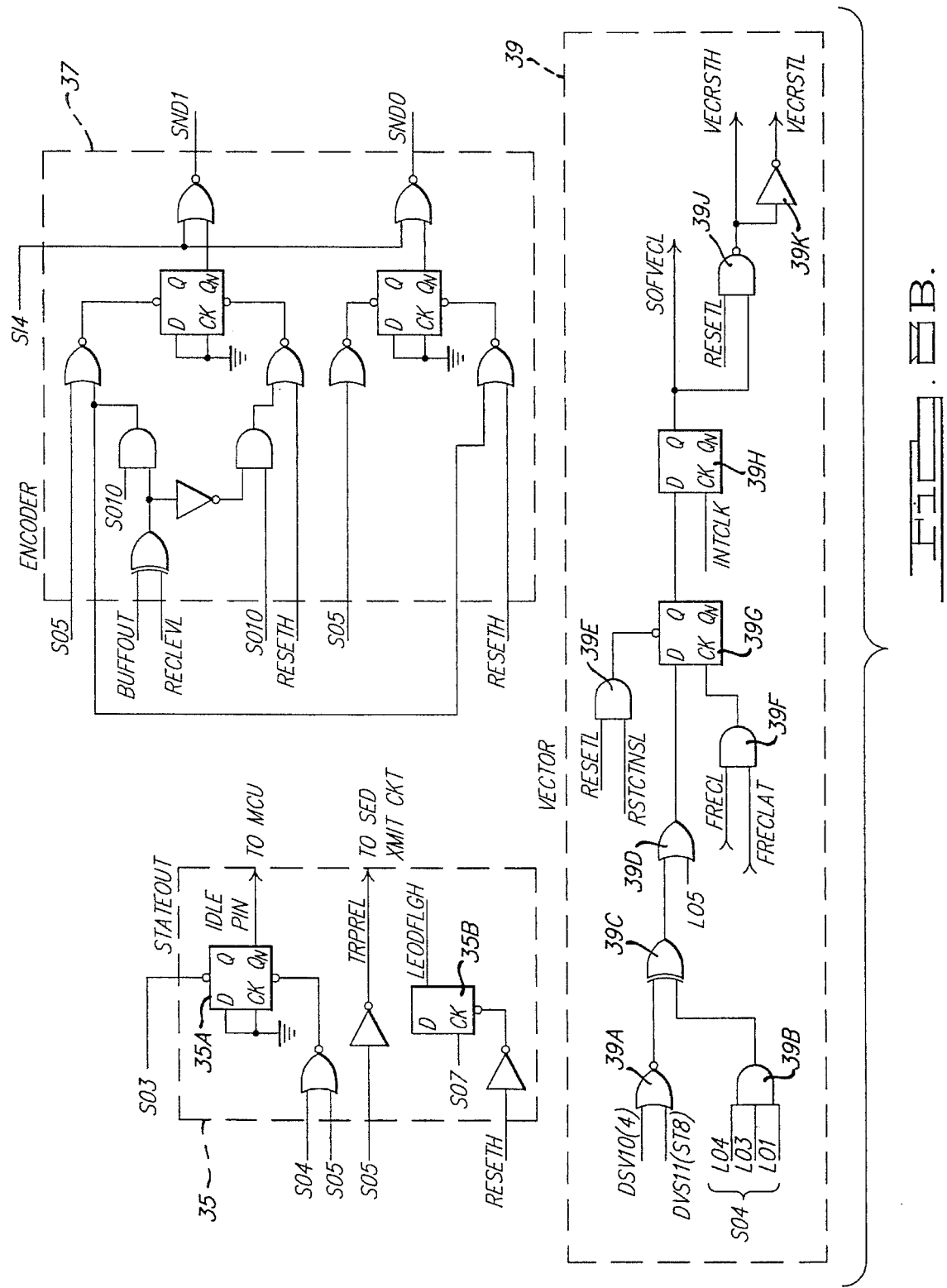

FIG. 8A depicts the logic circuits of the STATEIN circuit 31 and MSTATE circuit 33 while FIG. 8B depicts the logic circuits in STATEOUT circuit 35, encoder 37 and vector circuit 39.

MCU COMMUNICATIONS WITH THE LINK

MCU 18 does not interact with link 23 in the transmission and reception of messages over bus 12 until state machine 33 reaches state 3(ST-3). STATEIN 31, MSTATE 33, STATEOUT 35, encoder 37 and vector 39 go through various setting and clearing of set/reset (SR) latches and incrementing D Flip-flops(FF) to prepare for the next state and then enabling MSTATE 33 to establish the various present states. It should be noted that the clearing of the XMIT MODE latch, BYTE RDY and LAST BYTE D-FFs occur in case MSTATE 33 goes to ST0, ST1 and ST2 via an error detected ST (ST 25) or via a vector where any of these three latches may have remained set.

ST0 and ST1

With reference to FIGS. 4, 8A, 8B, 9, 10, 11 and primarily FIG. 7, after reset, MSTATE 33 goes immediately from ST0 to ST1 where the present state of the memory FFs 33b of MSTATE 33 yield bits forming the binary value of 15 or DSV15. (See chart associated with FIG. 8A). This state causes the synchronized output gates 33d to provide a SO1 status signal over the global feedback bus SO(29:0). Bus SO(29:0) routes to STATEIN ckt 31 and clears or resets the XMITMODE latch 31a, if not already cleared, producing the CLRXMIT MODE signal SI 4. Note that even numbered SI signals are the reset outputs of the latch or flip-flop. The SI 5 signal generates when the XMITMODE latch sets. MSTATE 33 remains in ST 1 until link 23 detects an end-of-frame (EOF) symbol appearing on bus 12 (SI 33). A detected EOF signal on bus 12 remaining LO for about 200 μs places the output of NS-decoder 33a in its next state. This action causes the O/P decoder 33c to go from a decoded state value (DSV) of 15 to a DSV of 4 or ST2.

sT2 (DSV 4)

Figure 11:
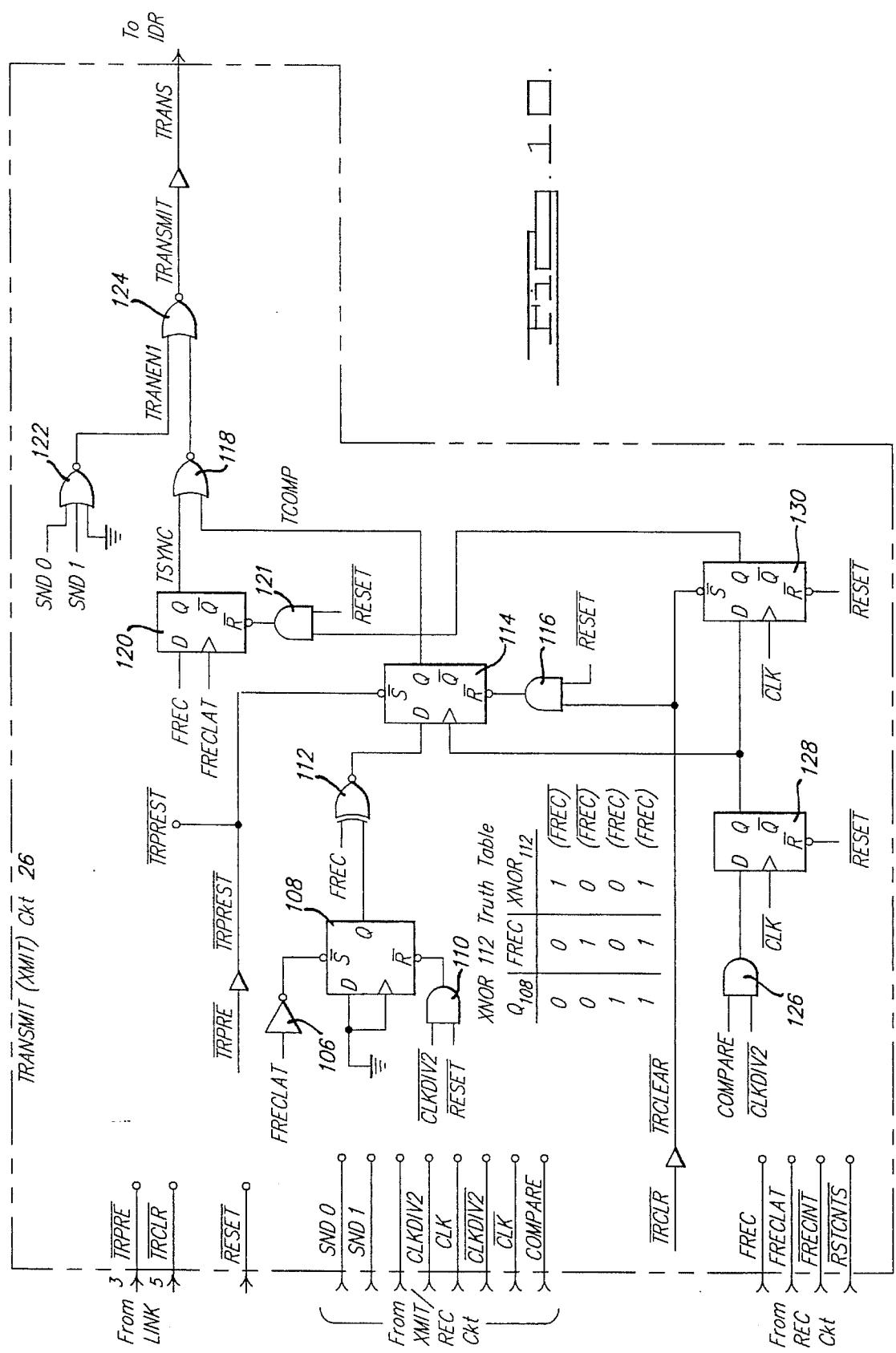
FIG. 11 illustrates in logic diagram form the transmit circuit of the symbol encoder decoder.

The REC Ckt 28 of SED 22 provides the interface between the receiver circuit of IDR 20 and STATEIN. Details of REC Ckt 28 appear in U.S. Pat. No 5,274,636 of the present assignee which is incorporated by reference (with modifications that add a BITVAL, a FRECINTH and an ARBCOMP circuit in REC Ckt 28 and a STENH circuit in the XMIT/REC Ckt 24. However, FIGS. 9, 10 and 11 show the modifications to SED 22).

The signals RECLEVL, LO4 and FRECINTH from REC Ckt 28 of SED 22 route to NOR gate 31g of STATEIN ckt 31, the output of which becomes the EOF signal (LO) (SI-32). SI-32 completes the requirements of the logic in NS-decoder 33a for changing the memory FFs 33b to state 2.

ST3 (DSV 27)

The STATEIN ckt 31 enables ST 3 by using the SO2 signal from global bus SO(29:0) to clear XMITMODE latch 31a, RDY D-FFs 31b, and the LAST BYTE D-FFs 31c, and setting IDLE SR latch 31d. These signals feed into the NS-decoder 33a which generates a DSV of 18 (ST-5).

ST5 (DSVS 18)

Arrangements of the state machine bypass state 4 when prepending the SOF to a message frame but utilizes ST4 to check SOF arbitration in a unique manner when the transmitted SOF symbol reflects back into the receiver ckt of IDR 20. Hence to generate DSV18 (state 5), the STATEIN Ckt 31 must utilize the DSV27 signal from the output of FF 33b, reset bit counter 31e (SI 21), clear the EOD flag latch 31f (SI 28), receive the RDY signal from MCU 18 and set the RDY FFs 31b (SI 19). Also, in the STATEOUT Ckt 35 of FIG. 8B, the IDLE pin latch 35b sets routing the IDLE pin signal to MCU 18. STATEIN 31 also records the reception of the IDLE pin signal in IDLE latch 31d (SI 7). The generation of S05 signal initiates the (TRPREL) signal which route to SED 22.

Hence, when MCU 18 asserts the RDY pulse, STATEIN 31 latches the request and communicates it to MSTATE 33. If the current state of MSTATE 33 is ST3 and bus 12 is idle, then the current state changes to ST5. MSTATE communicates the fact that the current state is ST5 to STATEOUT 35 and ENCODE 37 via the SO(29:0) bus. STATEOUT 35 asserts the transmit preset (TRPREL) signal which routes to the XMIT Ckt 26 of SED 22 to enable the start of transmission of the SOF symbol (causing the SED transmit pin to output a HI).

The task of ENDCODER 37 includes driving the SED'S SND0 and SND1 input pins to cause the proper transmit duration for a SOF symbol on the J1850 bus. SND0 and SND1 signals route to both the XMIT Ckt 26 to enable the transmission of SOF and to the XMIT/REC Ckt 24 to address the 4 TO 10 Decoder ROM 40 to establish the proper duration of the SOF symbol.

The transmit or TRANS pin, routes a HI logic signal to IDR 20 causing an output symbol on bus 12 to go HI. IDR 20 routes this current bus level to link 23 on the receive (REV) pin of SED 22.

Also link 22 prepares for the transfer of the first data byte from MCU 18 on to bus 12.

SED PROCESSING THE RECEIVED SIGNAL FROM BUS 12

With reference to FIG. 11, SED 22 receives the LO to HI transition of the rising edge of the SOF symbol, an analog signal from IDR 20. The FREC signal, a digital signal, in the REC Ckt 28 of SED 22 changes from LO to HI once the transition on the REC line passes through the digital filter comprised of the 3 BIT UP/DOWN Counter 46 and NAND gates 48 and 50 respectively and D-FF 52. Any transition on the FREC line causes the FRECLAT pulse and the FRECINTL pulse to generate. Also, the RSTCNTSL pulse, at gate 88, generates in response to system clock CLKDIV2 and FRECINTL. The FRECINTL pulse resets the free running 10 bit counter 42 of FIG. 9 as well as the receive ROM address counter 3 Bit Ripple Counter 90 of FIG. 11.

MEASURING THE TRANSMITTED SOF SIGNAL.

The 10 bit Counter 42 again starts counting. The SND0 and SND1 pins being driven by encoder 37 address the transmit half of the 4 to 10 Decoder ROM causing it to output the proper time duration for a SOF symbol. Comparator 44 compares every count of the 10 Bit Counter value to the transmit ROM value. When a match occurs, comparator 44 generates a pulse signal indicating a match. This pulse indicating a match causes XMIT Ckt 26 to toggle the TCOMP signal to the opposite value of FREC (provided FREC is not just changing). The TCOMP signal drives the TRANSMIT pin via NOR gate 124 which now goes LO. The HI to LO transition goes to IDR 20 to drive bus 12 LO provided no other node is transmitting a HI over bus 12.

The FREC signal changes from HI to LO once the transition passes through the digital filter. The combination of SED signals RECLEVL and FRECINTL (which changes from HI to LO shortly after FREC) creates the LINK STATEIN falling edge signal SI-25. This causes MSTATE 33 (which has been waiting in ST5) to travel to ST10.

The output of ST10 will cause encoder 37 to look at the bit value in the BYTE BUFFER (which link 23 loaded in from MCU 18 in ST6 and ST7) and drives the SED 22 SND0 and SND1 pins to transmit the bit of a data byte onto bus 12. Data byte transmissions are discussed in the co-pending application, Ser. No. 08/357,002, filed Dec. 16,1994.

AWAITING THE REFLECTED SOF SYMBOL

While SED 22 operates to transfer a SOF symbol and then to receive back the reflected SOF signal, MCU 18 and MSTATE 33 prepare the first data byte for transfer. MSTATE 33 moves from ST 5 to ST 8 and then waits in ST 8 until SED 22 sends a signal to STATEIN 31 that the falling edge of the SOF symbol occurred.

ST 6

Within ST 6, MCU 18 transfers the byte; a counter in STATEIN 31 initiates counting the bits of the byte and the RDY pin is latched in STATEOUT 35.

ST 7

In STATEOUT 35, the EOD flag latch 35b is latched. In STATEIN 31, the RDY latch is cleared. In MCU 18, the data byte register is cleared.

CHECKING ARBITRATION OF THE SOF SYMBOL

In vector circuit 39, if the SOF symbol is reflected back to link 23, then NOR 39a of FIG. 8B should receive a DSV 11 signal and AND 39b should receive a min 2nd ½ interbyte separation address LO 4, LO3 and LO1 (this address equals the value of a SOF send address). The output signal from these two gates will combine in exclusive OR (XOR) gate 39C to produce a LO output signal. If some other address is received during either a DSV(10)[ST 4] signal or a DSV(11) [ST 8]signal, a SOFVECL signal generates. A SOFVECL signal routes back to ST 0 to reset link 23 to indicate the presence of an error on bus 12. With this circuit, arbitration of SOF occurs with respect to another SOF symbol emanating from another node.

Other Protocol Symbols

The other protocol symbols, end-of-data (EOD) and end-of-frame (EOF) generate when bus 12 goes idle for 200 and 240 μs respectively and Link 23 recognizes the idle conditions.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A link apparatus containing a circuit for automatically prepending a protocol symbol to a data message to be placed on a communications bus, the link apparatus being contained in a node of a multiple node vehicle communications network, the bus being prescribed for use in an automobile industrial standard for data communications network interfaces, each node also containing a microcontroller (MCU) connected between an input device and input terminals of the link apparatus for receiving a chosen measurand from the input device and then translating the measurand into digital data messages in response to changes of the measurand, the link apparatus also containing a symbol encoder/decoder (SED) for receiving serially arranged bits of protocol and data messages and then formatting each bit into a variable pulse width modulated (VPWM) signal, each VPWMsignal being routed from the link apparatus to an integrated driver/receiver (IDR) circuit, also in each node, that connects to the bus, the IDR containing a transmitter circuit for converting each VPWM signal into a trapezoidal shaped waveform analog signal called a symbol containing information expressing a magnitude value of the digital bit component of the byte message, the IDR also containing a receiver circuit for receiving a reflection of each of the symbols from the bus and converting each symbol into a VPWM bit that route back to the link apparatus where a series of bits are reassembled by the SED into the original protocol and data byte information of the message placed on the bus, the link apparatus comprising:

A) a state machine device having:
   1) a statein unit at an input end,
   2) a main state machine unit having input terminals connected to output terminals of the statein unit and
   3) a stateout unit having input terminals connected to output terminals of the main state machine unit and the statein unit;

the state machine device being used to monitor output signals from the SED and the MCU to determine when the bus is idle and in a condition to receive a new message and to determine when the MCU has converted measurand information into data bytes;

B) an encoder circuit for accepting a signal from the state machine device during a particular state of the state machine device and then automatically generating a coded address that routes to the SED for generating a VPWM signal that routes to the transmitter circuit of the IDR for placing a start-of-frame (SOF) protocol symbol on the bus; and C) a vector device connected to the main state unit and the SED containing circuits for determining arbitration of the SOF protocol symbol with respect to other SOF protocol symbols that might appear on the bus nearly simultaneously, the vector device providing an error signal that resets the state machine device to an initial state if another protocol symbol from another node appears on the bus.

2. The link apparatus of claim 1 wherein the SED receives a reference clock signal from the MCU and from that clock signal develops a first clock signal for clocking a serial peripheral interface (SPI) of the MCU and a second and a third clock signals for enabling combinational logic and asynchronous circuits and clocking certain sequential logic circuits within the node.

3. The link apparatus of claim 2 wherein the second and third clock signals are used to clock the operation of the SED and certain synchronous circuits within the link apparatus, and wherein the SED which connects to the IDR converts incoming signals from the IDR into digital signals indicating the amplitude level of the bit appearing on the bus, the length of the bit, the bit value and any transitions occurring between succeeding bits in a bit stream.

4. The link apparatus of claim 3 wherein after the SED determines that the level of the signal on the bus remains at a logic LOW for a chosen duration, then a signal from the SED routes to the statein unit of the state machine device to indicate that the bus is idle, wherein in response to receiving the bus idle indicating signal, the statein unit sends a corresponding bus idle signal to the stateout unit, wherein upon receipt of the corresponding bus idle signal from the statein unit, the stateout unit latches an idle pin signal that routes to the MCU, and wherein the MCU uses the idle pin signal to initiate a byte ready signal, a handshaking signal, that routes to the statein unit, wherein upon receipt of the byte ready signal, the statein unit issues a signal to the stateout unit which in turn issues a transmit preset signal to SED, wherein the main state machine unit of the state machine device has sequentially changed states from an initial state to an enabling state that causes a signal to issue that routes to the encoder, wherein upon receipt of the signal from the state machine device , the encoder generates an address code that routes to the SED causing the SED to automatically generate a VPWM signal that routes to the IDR and then onto the bus as the trapezodial wave form signal representing a SOF symbol.

5. The link apparatus of claim 4 wherein the IDR causes a reflection of the SOF signal placed on the bus to route back to the SED and wherein the SED converts the reflected SOF signal into a bit length signal and wherein the main state machine unit which has incremented at least two states beyond the state that initiated the SOF signal, and wherein the vector circuit receives the bit length signal from the SED and signals from the main state machine unit indicating that the state machine has incremented at least two states beyond the state that initiated the SOF, and at an output terminal, producing a signal that indicates that the issued SOF signal has won arbitration over any other SOF signal that might have been placed on the bus by another node.

6. The link apparatus of claim 4 wherein the IDR causes a reflection of a SOF signal from another node, wherein the SED generates signals that route to the main state machine that does not cause the state machine to increment to another state, and wherein the vector device receives signals from the SED and the main state machine unit that causes an error signal to issue and to reset the link apparatus to an initial state.

7. A link apparatus used in a node of a multinode, collision-resolution, multiplexing system containing a circuit for automatically prepending a protocol symbol to a data message to be placed on a single-wire communications bus which has been prescribed for use in an automobile industrial standard for data communications network interfaces, each node also containing a microcontroller (MCU) connected between an input device and input terminals of the link apparatus for: (1) receiving a chosen measurand from the input device and then translating the measurand into a digital byte message in response to changes of the measurand, (2) formatting the magnitudes of the measurand into address codes for selecting symbols of various pulse widths for transmitting symbols over the bus, and (3) polling output ports connected to the link apparatus to determine if the link apparatus is in a transmitting or a receiving mode; and each node also containing an integrated driver/receiver (IDR) functioning as a transceiver that has an output that connects to the bus for sending to and receiving from other nodes connected to the bus each symbol placed on the bus in a chosen modified form, the link apparatus comprising:

A) a state machine device for establishing a series of operating states for the node comprising:
1) a statein unit having a plurality of synchronous and asynchronous holding registers;
2) a main state machine unit having: a) a next state decoder at an input port, b) a memory circuit composed of a parallel arrangement of a plurality of flip-flops connected to the output of the next state decoder, c) an output decoder having input terminals connected to the output of the memory circuit, and d) synchronized output gates having input terminals connected to the output of the memory circuit and output terminals providing synchronous output state signals within the link apparatus;

B) a stateout unit having input terminals connected to output terminals of the main state machine unit and the statein unit for providing control signals within the link apparatus and to the MCU;

C) an encoder circuit for accepting a signal from the state machine device during a particular state of the state machine device and then automatically generating a coded address used for generating a variable pulse width modulated (VPWM) signal that routes to the transmitter circuit of the IDR for placing a start of frame protocol symbol (SOF) on the bus;

D) a symbol encoder/decoder (SED) used in the link apparatus for translating the coded address from the encoder into the VPWM signal that routes to the IDR, the IDR containing a driver for converting each VPWM signal into a trapezoidal shaped waveform analog signal called a symbol containing information expressing a magnitude value of the digital bit component of the message; and E) a vector circuit connected to the main state unit and the SED containing circuits for determining arbitration of the SOF protocol symbol with respect to other SOF protocol symbols that might appear on the bus nearly simultaneously, the vector circuit providing an error signal that resets the state machine device to an initial state if another protocol symbol from another node appears on the bus.

8. The link apparatus of claim 7 wherein the MCU provides a reference clock signal to the link apparatus, wherein the SED generates a first clock signal for clocking a serial peripheral interface (SPI) of the MCU and a first set of the synchronous holding registers of the statein unit of the main state machine and a second clock signal for clocking the memory circuit of the main state machine, a second set of synchronous holding registers of the statein unit and certain circuits within the SED and a third clock signal used to clock the synchronized output gates of the main state machine, a third set of synchronous holding registers of the statein unit and certain other circuits in the SED.

9. The link apparatus of claim 8 wherein the SED which is also connected to the receiver of the IDR converts incoming signals into digital signal control signals indicating the amplitude level of the symbol appearing on the bus, the length of the symbol, the logic bit value of the symbol, and any transitions occurring between succeeding symbols.

10. The link apparatus of claim 9 wherein the asynchronous circuits of the statein unit use the digital signal control signals to determine if conditions on the bus are suitable to start a transmission of a message, whether the bus is idle and whether any previous transmission of data has been completed and whether the end of a message frame has ended.

11. The link apparatus of claim 10 wherein the MCU contains a firmware program for establishing a handshake signal of byte ready after obtaining input data from a sensor or application input device for generating a data message and after storing a first byte of the data message in a serial peripheral data register in response to the link apparatus asserting an idle pin that the MCU reads when the bus is in condition for the node to enter the transmit mode.

* * * * *